United States Patent
Tan et al.

(10) Patent No.: US 7,381,936 B2
(45) Date of Patent: Jun. 3, 2008

(54) SELF-CALIBRATING ANTI-BLOOMING CIRCUIT FOR CMOS IMAGE SENSOR HAVING A SPILLOVER PROTECTION PERFORMANCE IN RESPONSE TO A SPILLOVER CONDITION

(75) Inventors: Mehmet Ali Tan, Irvine, CA (US); Jiafu Luo, Thousand Oaks, CA (US)

(73) Assignee: ESS Technology, Inc., Fremont, CA (US)

( * ) Notice: Subject to any disclaimer, the term of this patent is extended or adjusted under 35 U.S.C. 154(b) by 809 days.

(21) Appl. No.: 10/975,474

(22) Filed: Oct. 29, 2004

(65) Prior Publication Data

US 2006/0092300 A1    May 4, 2006

(51) Int. Cl.
*H01L 27/00* (2006.01)

(52) U.S. Cl. .............................. 250/208.1; 250/214 R
(58) Field of Classification Search ............. 250/208.1, 250/214 R, 214.1; 257/290–292, 440, 249–257; 348/308–312
See application file for complete search history.

(56) References Cited

U.S. PATENT DOCUMENTS

| 5,587,596 A | 12/1996 | Chi et al. |
| 5,608,243 A * | 3/1997 | Chi et al. ................... 257/249 |
| 6,548,798 B2 | 4/2003 | Yoneda et al. |

* cited by examiner

*Primary Examiner*—Que T Le
(74) *Attorney, Agent, or Firm*—Farjami & Farjami LLP

(57) ABSTRACT

A method and apparatus to provide blooming protection for a pixel in an array while extending dynamic range.

15 Claims, 10 Drawing Sheets

SELF-CALIBRATING ANTI-BLOOMING CIRCUIT FOR CMOS IMAGE SENSOR HAVING A SPILLOVER PROTECTION PERFORMANCE IN RESPONSE TO A SPILLOVER CONDITION

BACKGROUND OF THE INVENTION

1. Technical Field

The invention is related to semiconductor imaging devices and in particular to such a device that can be fabricated using a standard CMOS process. The present invention provides a method and an apparatus to providing blooming protection for a pixel in an array while extending dynamic range.

2. Background Art

A complementary metal-oxide semiconductor (CMOS) image sensor is a device for converting optical images to electrical signals. That is, it responds to the visible light, and the signal electrons thus formed are converted to voltages. Then the voltages are subjected to a signal processing to reconvert the voltages to image information.

To provide context for the invention, an exemplary CMOS imaging system is described below. FIG. 1 is a block diagram of an imaging system 100 including an image capture circuit 110, a control circuit 112, an image processor 114 and an output device 116 all intercoupled as depicted.

Image capture circuit 110 includes an array of photoactive pixel circuits whose surfaces receive light projected from an image. The light energizes the pixel circuits to produce pixel signals as a function of the light energy received. Decoding circuits select among the pixel circuits to produce an analog image signal $V_{OUT}$ at a node 111 that is representative of the captured image.

Control circuit 112 has an input 118 for receiving a user initiated control signal $V_{CONTROL}$ and an output bus 113 that provides digital address data for selecting pixels. A digital initialization signal reset is produced at a node 117 prior to capturing an image in order to clear the array of residual signals from a previous capture. Control signal $V_{CONTROL}$ allows a user to control exposure time, the amount of zoom, or to provide other imaging features.

Imaging system 100 may be utilized in a wide variety of devices including copiers, scanners, cameras, medical devices, toys, machine vision systems, vehicle navigation systems, video telephones, computer input devices, surveillance systems, auto focus systems, star trackers, motion detection systems, image stabilization systems, data compression systems for high-definition television or other imaging devices. Such devices are generally driven with a low voltage, and a single chip is sufficient in most cases.

In order to meet the increasing need for high speed image sensor devices, it is becoming necessary to integrate the image sensor array with other digital circuitry that controls the operation of the array and processes the array output. Integration of the image sensors with CMOS support circuitry is desirable because of the low power consumption characteristics, maturity and common availability of CMOS technology.

A CMOS imaging circuit may be composed of an array of pixels. FIG. 2 is a block diagram of one pixel cell 210 of an array of photoactive pixel circuits. Each cell 210 includes a photogate 212, a charge transfer section 214 adjacent the photogate 212 and a readout circuit 216 adjacent the charge transfer section 214. FIG. 3 shows an array of many photoactive pixel circuits cells 310 formed on a silicon substrate 320.

A conventional CMOS imager pixel typically employs a phototransistor or photodiode as a light detecting element, and is usually operated as follows. First, the pixel photodiode is reset with a reset voltage. This removes electrons from the "charge well" or "pixel well" of the photodetector, thereby placing an electronic charge across the capacitance associated with the photodiode. Next, the reset voltage is removed and the photodiode exposed to illumination. The incoming light creates free electrons in the pixel well, causing the charge stored across the photodiode capacitance to decrease at a rate proportional to the incident illumination intensity. FIG. 4 shows a schematic view of a pixel well as light shines upon it. At the end of an exposure period, the change in diode capacitance charge is detected and the photodiode is reset. The difference between the reset voltage and the voltage corresponding to the final capacitance charge indicates the amount of light received by the photodiode.

Conventionally, CMOS image sensors have several limitations, for example, limited dynamic range and blooming. Both are discussed below.

A problem from which conventional CMOS image sensors suffer is a phenomenon called blooming. Image sensor devices that integrate charge created by incident photons have dynamic range limited by the amount of charge that can be collected and held in a given photosite. For example, the maximum amount of charge that can be collected and detected in a pixel is proportional to the pixel area. As discussed above, during the optical integration period, electrons are created in a pixel well at a rate proportional to the light intensity reaching the sensing area. As the electrons are collected in the photodetector, it begins to fill. If the photodetector charge well becomes full of charge, it becomes saturated and blooming may occur.

Blooming is a phenomenon in which excess charge from a pixel spills over into adjacent pixels, causing blurring and related image artifacts. Blooming may cause the neighboring pixels to look brighter than an accurate representation of the light absorbed by the photodiode in that pixel. This phenomena is illustrated in FIG. 4, which shows electrons escaping from a full pixel well to a neighboring well.

One solution for blooming is shunting off the excess current caused by the incoming light once the pixel becomes full. A mechanism for doing this uses the reset transistor, which is ordinarily used to remove all electrons from the pixel well before beginning an exposure. During exposure, the reset transistor can be biased slightly to operate in the sub-threshold region, allowing excess charge to flow to the reset drain, thereby acting as an anti-blooming drain.

Another problem conventional CMOS image sensors have is limited dynamic range. CMOS imagers generally are characterized by a linear voltage-to-light response, that is, the imager output voltage is approximately linearly proportional to the integrated intensity of the light incident on the imager. The imager output voltage can be characterized by a dynamic range, given as the ratio of the maximum detectable illumination intensity of the imager to the minimum detectable illumination intensity of the imager. It is well understood that the dynamic range of the output voltage sets the overall dynamic range of the imager. The illumination intensity that causes the photodiode capacitance charge to be completely dissipated prior to the end of the exposure period, thereby saturating the pixel, sets the upper end of the pixel dynamic range, while thermally generated photodiode charge and other noise factors set the lower end of the pixel dynamic range. If the dynamic range of a scene to be imaged exceeds the dynamic range of an imager, portions of the scene will saturate the imager and appear either completely black or completely white. This can be problematic for imaging large dynamic range scenes, such as outdoor scenes.

The graphs illustrated in FIG. 5 show an output voltage of a pixel (Bus) and an output voltage of a photo-diode voltage (Vph) within the pixel. Note that, as shown, this pixel is configured to have an output voltage inversely proportional to the number of electrons collected in the photodiode. The photo-diode voltage (Vph) starts clamping near the end of the integration period, indicating that the pixel well is full, and the excess charge is leaking to the substrate. The pixel output voltage (Bus) clamps earlier than the photodiode voltage because of the voltage drops of the junctions in the pixel structure. This means that even before the pixel is completely full, the output of the pixel loses gain and the dynamic range of the pixel circuit is limited. Note that when the output voltage clamps, the pixel no longer has a linear voltage-to-light response; the output clamps at approximately the maximum linear output of the pixel. (In this pixel, because the pixel output voltage falls with increasing numbers of collected electrons, the "maximum linear output" is a low or a near-minimum voltage. In alternative pixels, the "maximum linear output" may be a high or a near-maximum voltage.) The problems of blooming and limited dynamic range are related. The use of a reset transistor to prevent blooming is very sensitive to the voltage applied to the reset transistor gate. If the reset voltage is too low, no electrons (or an insufficient number of electrons) will be shunted out of the pixel well and blooming may occur. If the reset voltage is too high, blooming will be prevented, but at the cost of limiting the dynamic range of the pixel, because electrons will be shunted out of the pixel well before the well is full, limiting the maximum charge that can be collected.

The proper voltage to be applied to the reset transistor depends on a variety of factors, including manufacturing process parameters and the temperature of the imager array. Thus, the proper bias voltage varies from imager array to imager array, and varies over time as operating conditions change. Prior approaches to biasing the reset transistor that used a fixed bias voltage failed to account for these variations, and suffered from blooming or reduced dynamic range.

It is, therefore, desirable to take into account manufacturing process parameters, temperature dependencies and other factors that might affect the transistor operation in providing a method and an apparatus to determine the voltage level needed to be applied to a reset transistor gate in a real pixel to prevent blooming.

DETAILED DESCRIPTION OF THE INVENTION

Embodiments of the invention provide a method and an apparatus for providing blooming protection for a imager cell, or a pixel, in an image array while extending the dynamic range. The terms imager cell, pixel cell and pixel may be used interchangeably in this description. Also, the terms imager array and pixel array may be used interchangeably in this description. Each pixel in an image array may include at least one transistor for resetting the pixel, typically an n-channel, metal-oxide-semiconductor field-effect transistor (MOSFET). The reset transistor receives a voltage at its gate terminal. The gate voltage, in turn, controls whether the reset transistor will operate to reset the pixel well or as an anti-blooming drain.

Embodiments of the invention provide a method and an apparatus to determine the voltage $V_G$ applied to the reset transistor to prevent blooming without sacrificing dynamic range, by taking into account the manufacturing process parameters and temperature dependencies of the pixel array. This voltage is the voltage needed to slightly turn "on" the pixel reset transistor slightly, just enough to shunt excess charge to a voltage source and prevent it from bleeding into nearby pixels when it is exposed to light. The gate voltage $V_G$ applied to a reset transistor gate in a pixel to prevent blooming will vary from array to array, depending on manufacturing process parameters and temperature. Embodiments of the invention may also provide a method and apparatus for selectively varying the DC bias to provide blooming control that is self-calibrating. The imaging array and voltage generation circuitry may be integrated on the same semiconductor substrate, allowing dependencies on the manufacturing process parameters to be eliminated.

Figure 1:
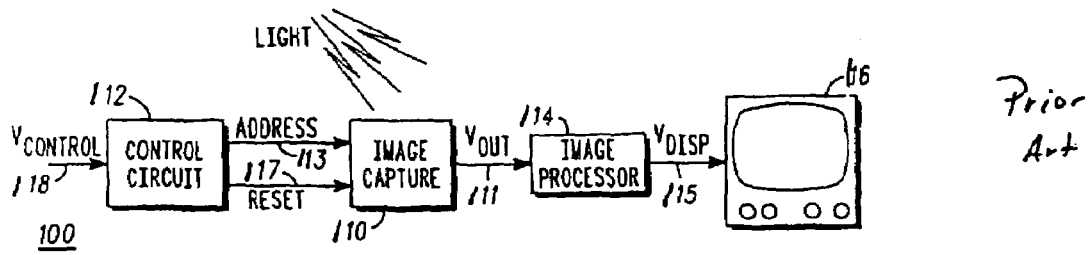
FIG. 1 is a diagram illustrating an exemplary CMOS imaging system of the prior art.
Figure 2:
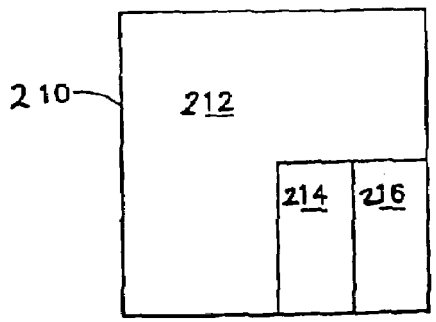
FIG. 2 is a diagram illustrating a block diagram of one pixel of the prior art.
Figure 3:
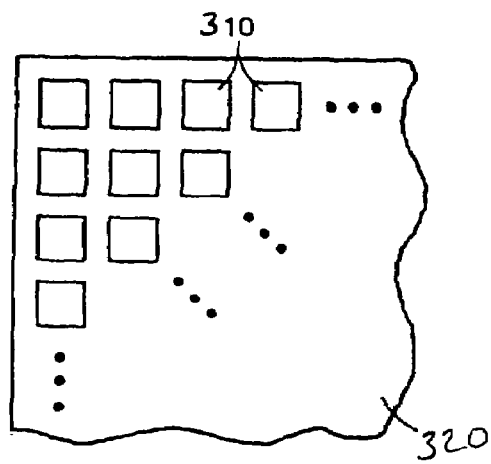
FIG. 3 is a diagram illustrating an array of many photoactive pixel circuits cells formed on a silicon substrate of the prior art.
Figure 4:
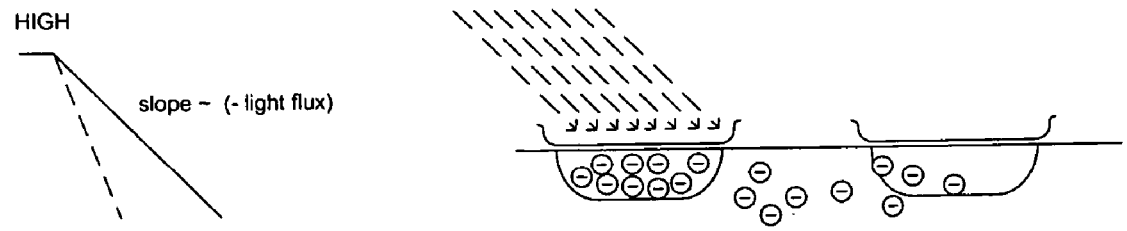
FIG. 4 is diagram illustrating pixel wells undergoing the blooming phenomena.
Figure 5:
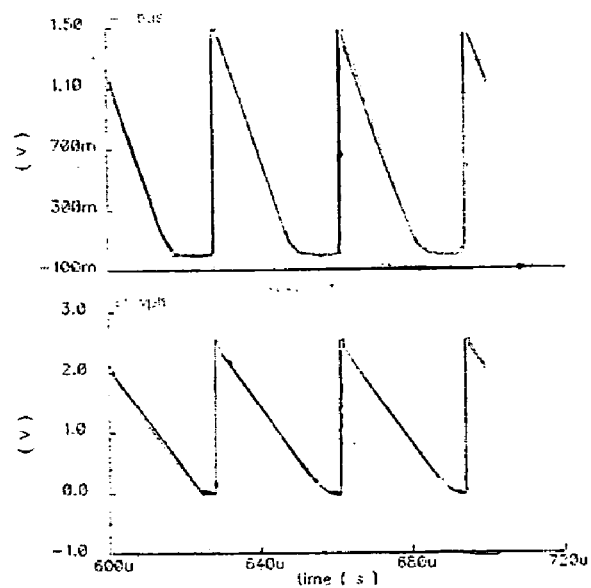
FIG. 5 is a diagram illustrating waveforms of photo-diode voltage (Vph) and the pixel output voltage (Bus) during blooming.
Figure 6:
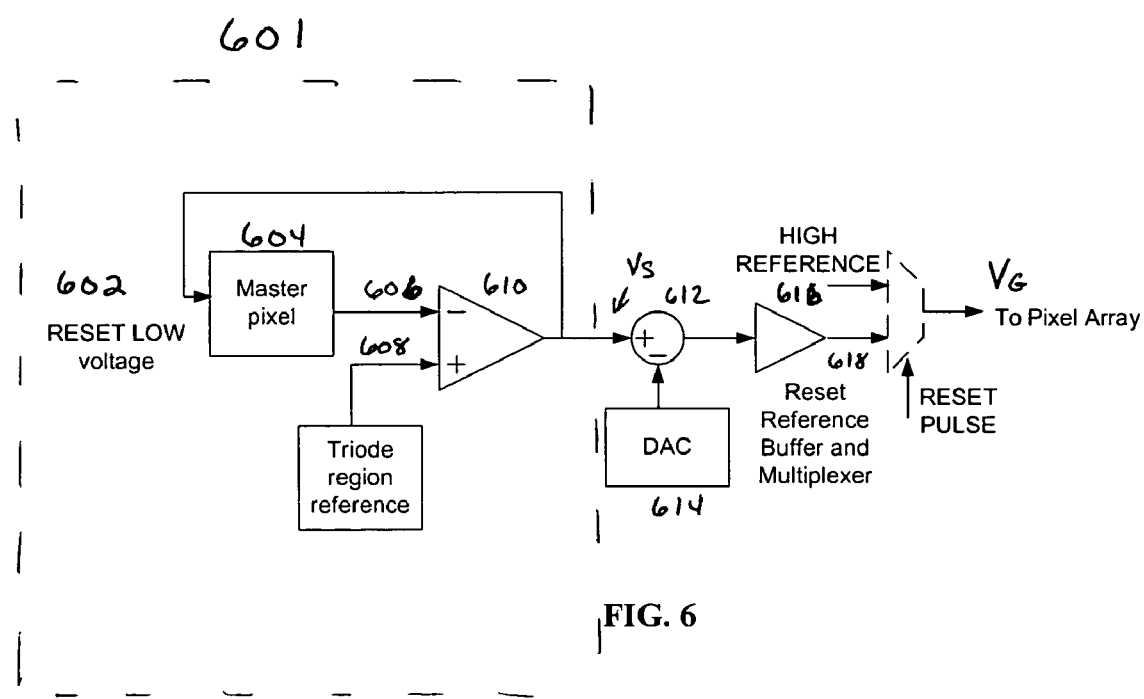
FIG. 6 is a diagram illustrating one embodiment of an anti-blooming circuit.

In an embodiment of the invention shown in FIG. 6, the anti-blooming circuit has a servo loop 601, which includes master pixel 604, triode region reference 609 and at least one operational amplifier 610. The circuit also may include adder 612, DAC 614, reset reference buffer and multiplexer 618, and high reference 616. The output of the multiplexer output $V_G$ 622 is controlled by reset pulse 620 and is connected to a pixel array (not shown). The servo is constructed in the circuit level, which this helps to eliminate the temperature and process dependencies.

This embodiment provides a servo loop (601) circuit to assist in determining the voltage $V_G$ to be applied to the reset transistor gates of the real pixel array to prevent blooming and extend the dynamic range. The reset transistor gate will be biased at a voltage greater than zero Volts in order to act as a lateral anti-blooming drain by allowing excess charge to flow to the reset drain. Preferably, the voltage $V_G$ applied to the reset transistor is set low enough so as not to decrease the dynamic range of the pixel by draining too much current. The servo is configured to keep the master pixel circuit's minimum output voltage at about the saturation voltage ($V_{Dsat}$) of the current sink transistor that biases a pixel. This transistor may be outside of the pixel array. The servo provides a means for self-calibration, which eliminates the major process and temperature dependent parameters of the pixel circuit.

As shown in FIG. 6, the operational amplifier 610 receives two inputs. The triode region reference output 608 is used to ascertain $V_{Dsat}$. The output of the triode region reference 609 is applied to the non-inverting terminal 608 of the operational amplifier and the output ($V_{BUS}$) of the master pixel circuit 604 is connected to the inverting terminal 606 of the operational amplifier. The output of the operational amplifier 610 is fed back to the input of the master pixel circuit 604, forming a feedback loop. As is apparent to one of skill in the art, when the loop is closed, the operational amplifier 610 acts to make the steady-state value of the master pixel output equal to the triode region reference output voltage. (In alternative embodiments, a comparator may be used in place of the operational amplifier, or the operational amplifier may be configured as a comparator. The servo loop may include a low-pass filter to improve convergence and eliminate noise introduced by a comparator or operational amplifier.) The steady-state output of the operational amplifier is RESET LOW voltage 602. Thus this circuit is used to determine the voltage to apply to the reset transistor gate of the master pixel to cause the output of the master pixel to be on the edge of the triode region. The amplifier output is used to generate a voltage selectively applied to the reset transistors of the imager cells. This voltage, which is process-dependent and temperature-dependent, can be used to determine the voltage to apply to the reset input of the real pixels, thereby clamping the photodiodes before they bloom. This is now explained more fully.

The triode region reference circuit 609 replicates an approximate operating range of a transistor in a pixel. The triode region reference circuit provides a DC output voltage that is approximately equal to a transistor drain-source saturation voltage $V_{Dsat}$. (The output of the triode region reference circuit may be a single voltage or the output may be differential and have two or more output voltages.) The voltage $V_{Dsat}$ corresponds to the point at which the pixel output voltage begins to clamp, and is process- and temperature-dependent. $V_{Dsat}$ is typically on the order of 50 mV-150 mV, depending on the real pixel circuit design. As will be shown below, the voltage $V_{Dsat}$ is used to determine the voltage $V_G$ applied to reset transistor to prevent blooming.

Figure 7:
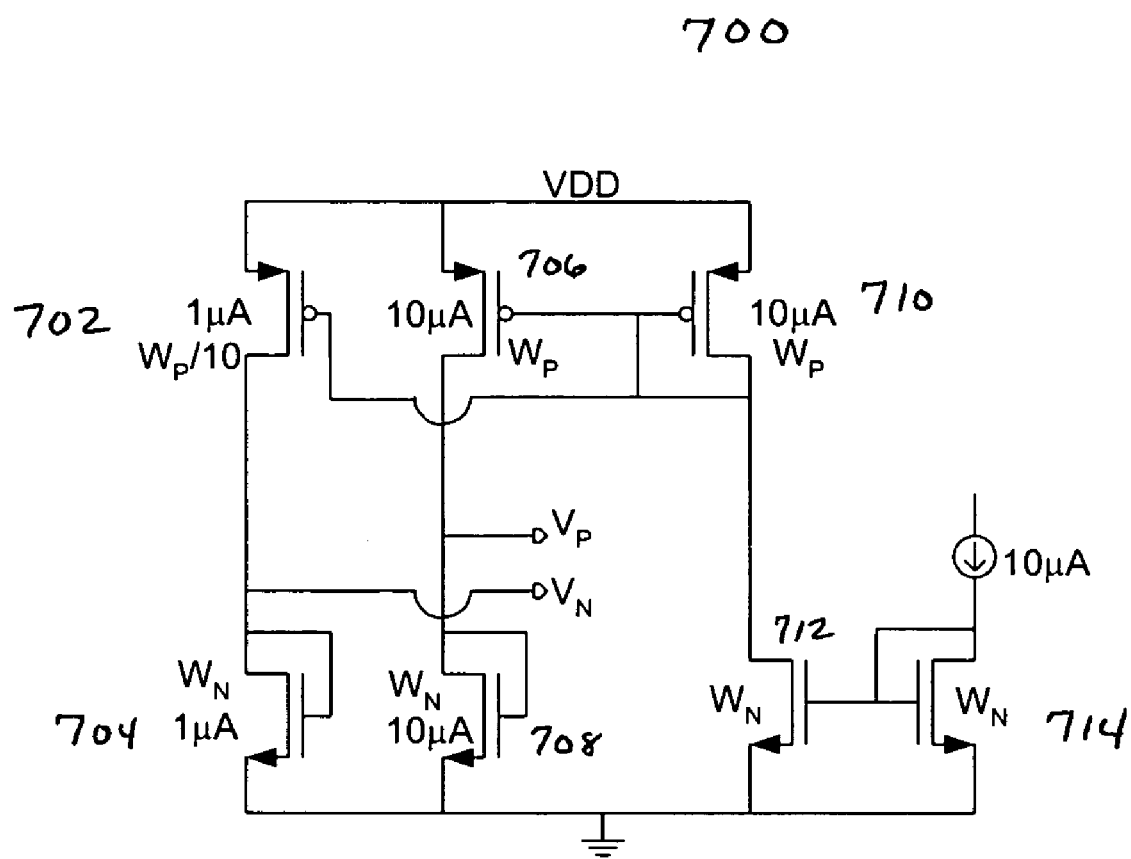
FIG. 7 is diagram illustrating the triode region reference circuit depicted in FIG. 6.

An example of a triode region reference circuit is shown in FIG. 7. The circuit 700 generates two outputs: $V_N$ and $V_P$. Transistor 712 is configured to mirror the current flowing through transistor 714, such that 10 μA is thereby drawn from VDD through transistors 710 and 712. Transistors 706 and 702 are configured to mirror transistor 710. Because transistor 706 is the same as transistor 710, 10 μA is drawn through transistors 706 and 708. The output $V_P$ is therefore equal to the gate-source voltage of the NFET 708.

In contrast, transistor 702 is constructed with one-tenth the width of transistor 710. Only 1 μA is drawn through transistors 702 and 704. But because NFET 704 is constructed with a standard width, transistor 704 is starved of current and operates near a sub-threshold level, causing the output $V_N$ to be approximately the voltage threshold $V_t$ of the NFET 704. Thus, the voltage difference between $V_P$ and $V_N$ is $V_{GS}$-$V_t$, which is approximately equal to $V_{Dsat}$. The triode region reference circuit has a differential output voltage representative of a voltage level approximately equal to a maximum linear output of an imager cell.

The triode region reference circuit 700 can be used in the servo loop circuit 601 of FIG. 6 in a number of ways. For example, an operational amplifier (not shown) can be configured to subtract $V_N$ from $V_P$ and thereby provide $V_{Dsat}$ as an output. This output may then be connected to the non-inverting input 608 of the operational amplifier 610 shown in FIG. 6. Alternatively, the operational amplifier 610 may be configured to accept three inputs and determine the difference $V_P$-$V_N$ internally.

Figure 8:
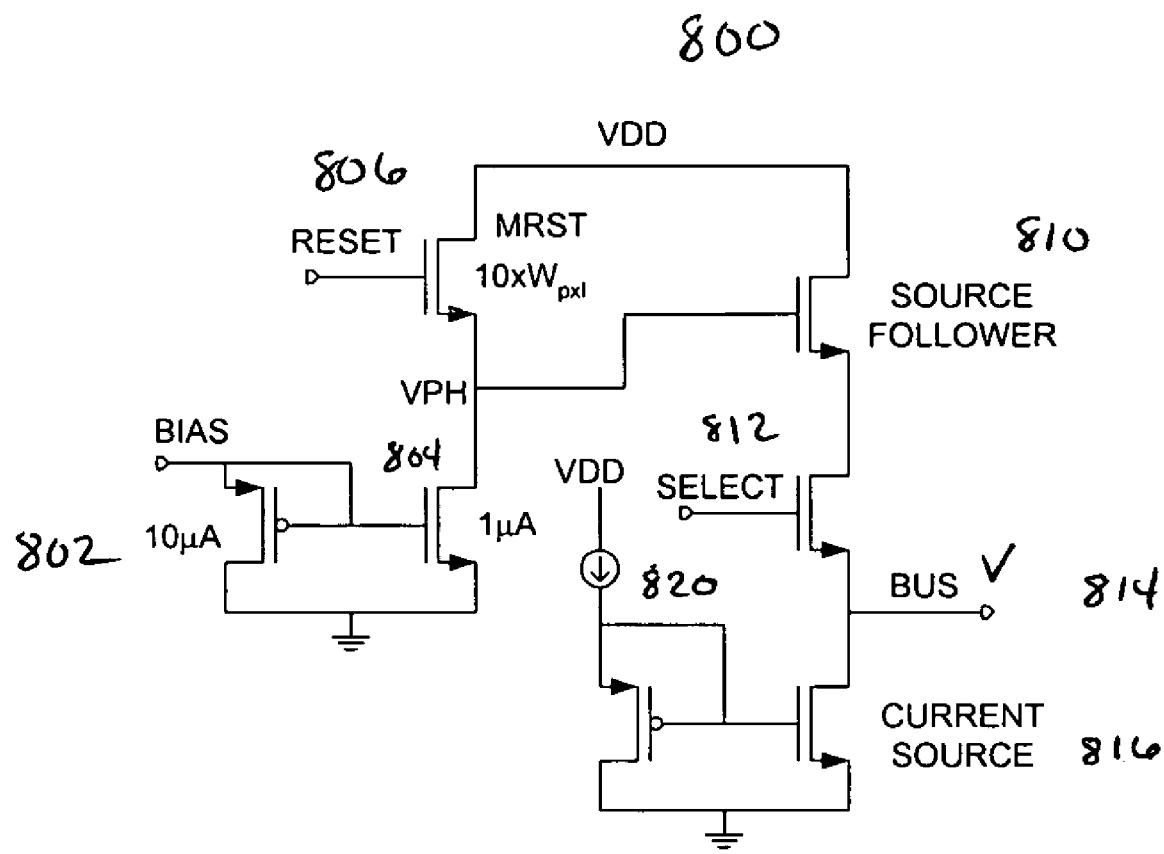
FIG. 8 is diagram illustrating the master pixel circuit depicted in FIG. 6.
Figure 9:
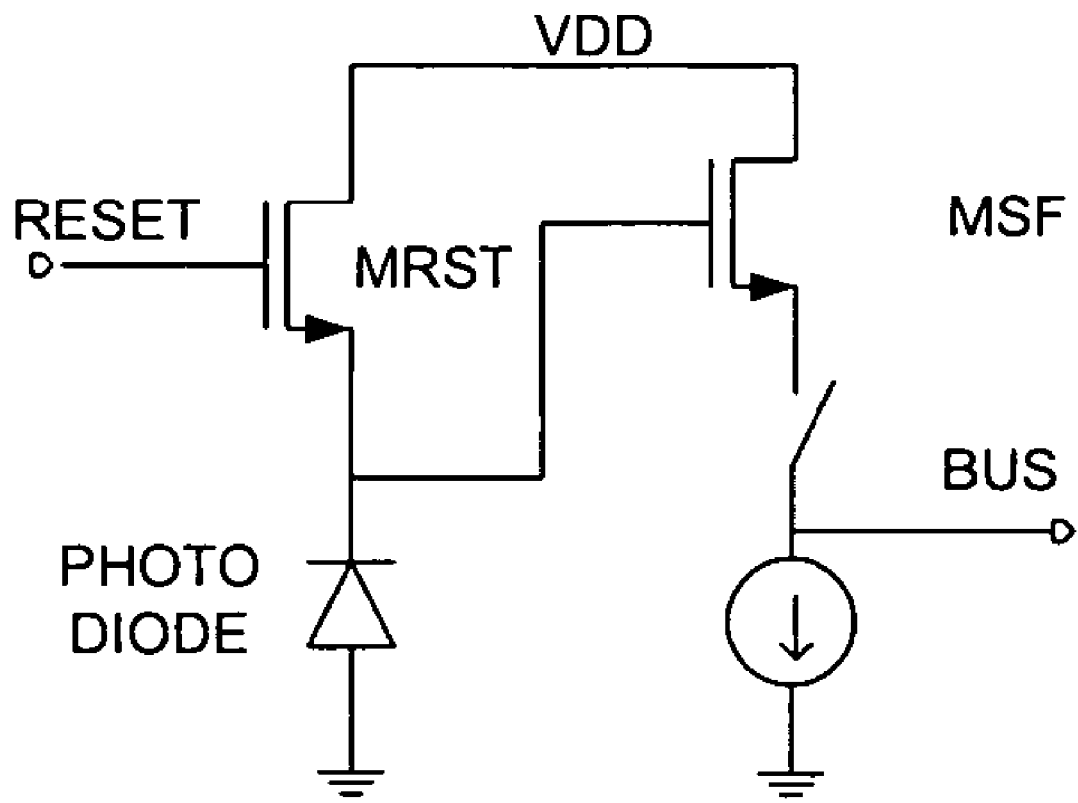
FIG. 9 is a diagram illustrating a real pixel circuit in an embodiment of the present invention.
Figure 10:
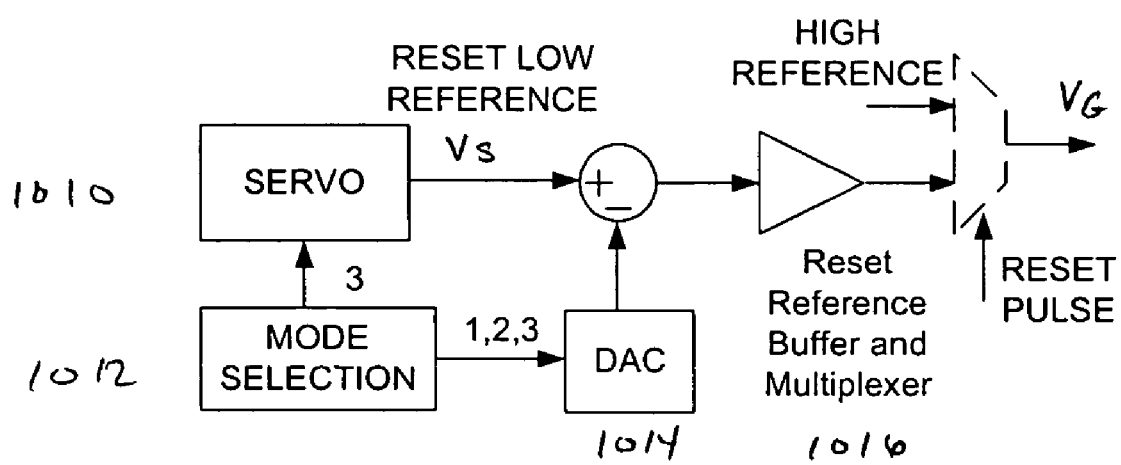
FIG. 10 illustrates another embodiment of the invention that includes mode-selection circuitry.

FIG. 8 illustrates a master pixel circuit 800 of the anti-blooming circuit. The master pixel is not a real pixel but is an electronic circuit that mimics a real pixel's DC voltage gain and operating point properties for any corner of its manufacturing process parameters. The master pixel circuit may have operational characteristics similar to those of the imager cells. The circuitry of the master pixel circuit 800 is similar to a real pixel, shown in FIG. 9, except that the photodiode has been replaced by a current sink and the width of the reset transistor is increased by a factor of 10. The other transistors in the circuit 800 are the same as those in a real pixel, particularly current source NFET 816. The master pixel functions to generate an output signal $V_{BUS}$ 814, whose value is related to the voltage applied to reset transistor 806 in the master pixel. The current sink provided by transistor 804 is configured draw to 1 μA through the reset transistor 806. The master pixel circuit has an output representative of an output voltage of any one or more of the imager cells when biased in the subthreshold region at a fixed current.

The master pixel circuit 800 can be used in the servo loop circuit 601 of FIG. 6 in the following manner. The output signal $V_{BUS}$ 814 is connected to the inverting terminal 606 of the operational amplifier 610. The servo loop is closed by supplying the output of the operational amplifier 610 (RESET LOW voltage 602) to the gate of the reset transistor 806. When the circuit achieves steady-state operation, the output signal $V_{BUS}$ 814 will be equal to $V_{Dsat}$. Then the RESET LOW voltage 602 will be the voltage needed to pass 1 μA of current through reset transistor 806 when current source NFET 816 is on the edge of the triode region. Note that reset transistor 806 is operating in the subthreshold region because RESET LOW voltage 602 will be below the threshold voltage. Furthermore, because reset transistor 806 is ten times as wide as the reset transistor of a real pixel, RESET LOW voltage 602 will be the voltage needed to draw 0.1 μA of current through a real pixel's reset transistor when its output current source transistor is on the edge of the triode region.

In summary, the servo circuit 601 determines the reset low voltage 602 (or $V_s$) needed to prevent a real pixel from blooming while maximizing its dynamic range. A pixel's output will clamp when its output current source transistor goes into saturation. The servo circuit determines when the current source transistor 816 in the master pixel reaches the triode region (saturation point). At the same time, the servo circuit determines the reset transistor gate voltage needed to drain off excess pixel current. The output of the servo circuit $V_s$ can be used in real pixels to prevent blooming without decreasing the effective dynamic range of the pixel. Because the servo circuit has the same dependence on the supply voltage, process parameters, and temperature as does a real pixel, the anti-blooming circuit is self-calibrating. The servo circuit allows the anti-blooming circuit to be substantially supply-voltage-, process-, and temperature-independent.

The embodiment shown in FIG. 6 provides a way to adjust the voltage that is applied to the pixel reset transistors. The servo circuit 601 determines the reset gate voltage that produces the edge of the triode region on the master pixel output 814 for a 0.1 µA pixel current. In practice, the pixel current is related to the intensity of incident light and is generally different from 0.1 µA. Accordingly, the point at which a pixel begins to bloom is dependent not only on the pixel's electron capacity but also the pixel current and the integration time.

Thus, if an anti-blooming circuit removes electrons from the well before it is full, it can reduce the effective dynamic range of the imager and decrease the fidelity of the resulting image to the true scene. Dynamic range is the ratio of the highest (lightest) signal than an imager can record to the lowest (darkest) signal. The lightest signal would correspond to the brightest highlights in an image, the darkest signal to the deepest shadows. In order to best use the dynamic range of an imager, a brighter image may call for shorter integration times and a darker image may call for longer integration times.

Accordingly, the anti-blooming circuit may be configured to clamp the photodiode near the end of the integration time, so as not to reduce the effective dynamic range. An embodiment of the present invention may include DAC 614 for adjusting (or scaling) the reset voltage for currents associated with different integration times/exposure times, using the voltage $V_s$ generated by the servo circuit as a reference. Adder 612 may be used to output a voltage that is the difference (or alternatively, the sum) of the servo circuit output voltage $V_s$ and the DAC 614 output voltage. The voltage introduced by DAC 614 provides a means for adjusting the voltage applied to the gates of the reset transistors to compensate for the ratio of a current in an actual pixel to the 0.1 µA current in the master pixel, for a given integration time. The dependence of the voltage on the ratio is determined by the sub-threshold operation of a MOSFET and, to first order, is not process-dependent. An example of how the DAC value may be determined is shown below.

The approximate DAC output for a given integration time may be calculated by using the sub-threshold model of the MOSFET transistor. For example, suppose the capacity of a pixel well (the number that make the well "full") is 20,000 electrons and the exposure time is $\Delta T=33$ ms. Using the formula $I_D=\Delta Q/\Delta T$, the current to be drained by the reset transistor (drain current $I_D$) would be $$I_D=\Delta Q/\Delta T=20000*(1.6e\text{-}19\ C)/(33e\text{-}3\ s) \sim 100\ \text{fA},$$

where 1.6e-19 C is the charge of one electron.

The corresponding current in the pixel master circuit is 0.1 µA. Using the sub-threshold model of the MOSFET transistor, one of ordinary skill can derive that, for optimal dynamic range usage, the difference between the $V_{GS}$ voltages of the reset transistors of the master pixel circuit and the real pixels should be $$\Delta V_{GS}=n\ V_T \ln(0.1e\text{-}6/100e\text{-}15*\Delta T/33e\text{-}3)$$

where $V_T$ is the thermal voltage (kT/q–about 25 mV at room temperature); n represents a constant determined by the gate insulating film capacitance and the depletion layer capacitance; and $\Delta T$ is the integration time.

This suggests that if the integration time is chosen in the range 33 µs-3.3 ms, the voltage difference that may be provided by the DAC will be in the 270 mV-746 mV range.

In operation, DAC settings may be determined either from a possibly contemporaneous calculation or a table lookup. A look-up-table may be preferable if the output is not quickly or easily calculated. A memory may be provided for storing a plurality of adjusting values or adjusting coefficients corresponding to different exposure times of the imager cells.

The anti-blooming circuit may be configured to have multiple modes of operation. Mode Selection Circuit 1012 may select the operating mode of the circuit. For option 1, No control, the reset gate voltage $V_G$ value is set at or near zero Volts during imaging. This option does not provide any anti-blooming control for the pixels in an array. For option 2, the reset gate voltage value during imaging is set by the DAC output linearly. For option 3, the reset gate voltage value during imaging is controlled or set by the servo and DAC in combination. These choices are set by a 2-bit register "bloommux[1:0]" according to Table 1. The table also shows that circuit blocks may be powered down when unused. Note that "10" and "11" values correspond to identical operations.

TABLE 1

Register value versus Mode of operation selected by the multiplexer

| bloommux[1:0] | Operation | Power UP | Power DOWN |
|---|---|---|---|
| 00 | No control, RESET LOW voltage is almost zero. <13 mV | None | Both |
| 01 | DAC control | DAC | Servo |
| 10 | Servo and DAC control | Both | None |
| 11 | Servo and DAC control | Both | None |

Figure 11:
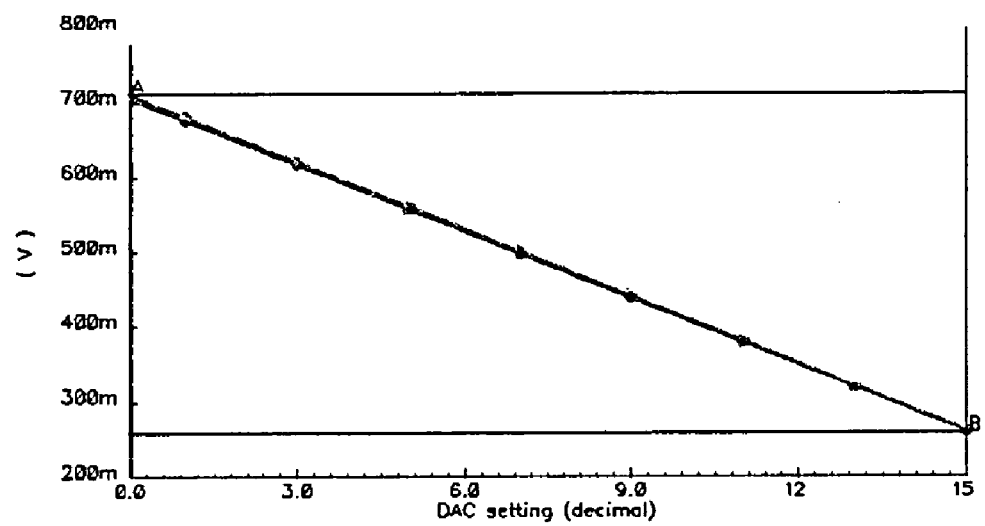
FIG. 11 is graph showing the output voltage for the DAC-only mode in the circuit of FIG. 10.

The DAC-only operating mode is selected when "bloommux[1:0]" register is set to "01". The DAC is controlled by a 4-bit register "bloom[3:0]". Output voltage of the DAC is approximately expressed by $$V_{out} = 0.7 - \sum_{i=0}^{3}$$

bloom[i]*$2^i$*30e-3 V, where bloom[i]={1 or 0}, as shown in FIG. 11. In this exemplary configuration, the voltage output is a decreasing function of the DAC setting.

The operating mode with Servo and DAC control combined is selected when "bloommux[1:0]" register is set to "10" or "11". The base output voltage is set by the servo and is designated Vs in the equation below. The output voltage for a given DAC setting is approximately expressed by $$V_{out} = V_s + \sum_{i=0}^{3} \text{bloom}[i]*2^i*30e\text{-}3V., \text{ where bloom}[i] = \{1 \text{ or } 0\}$$

Figure 12:
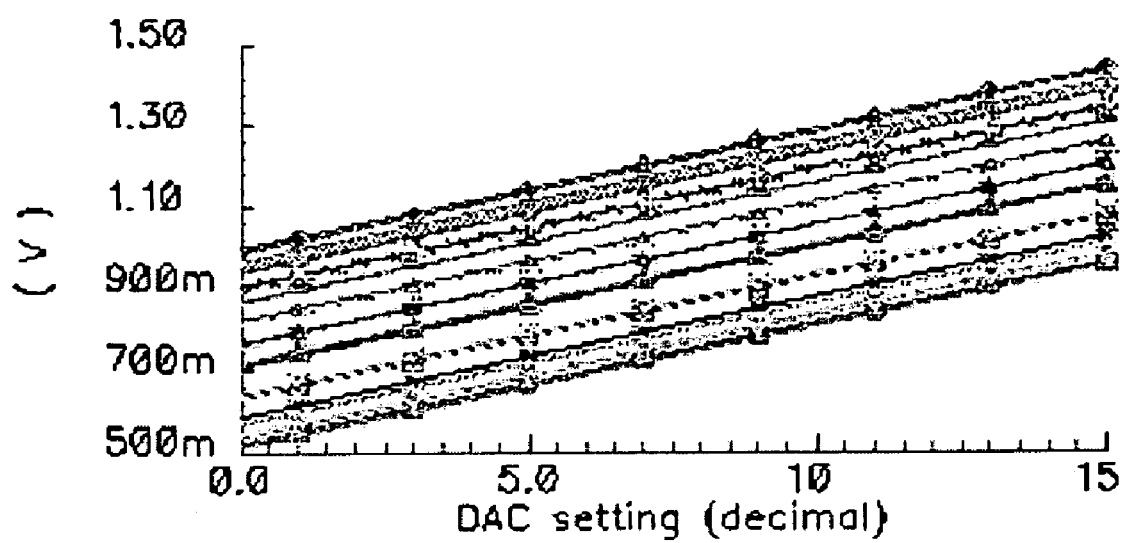
FIG. 12 is graph showing RESET control voltage vs. DAC for the operation of the circuit in FIG. 10.

FIG. 12 shows the RESET control voltage vs. DAC setting in this operating mode for various corners of the manufacturing process parameters. In this exemplary configuration, the voltage output is an increasing function of the DAC setting.

Figure 13:
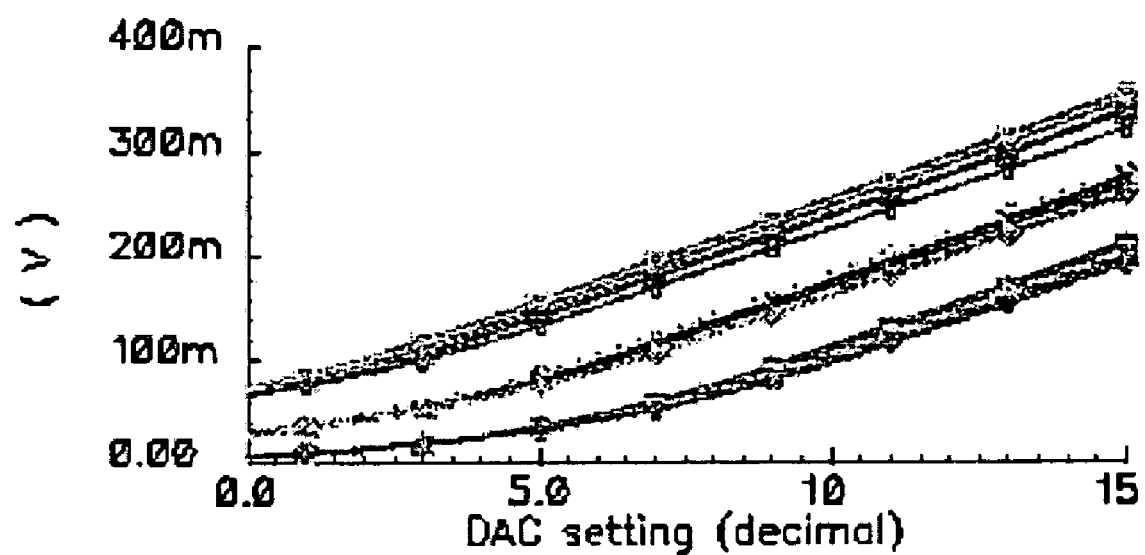
FIG. 13 is graph showing the clamp voltage at the active pixel output in the circuit in FIG. 10.
Figure 14:
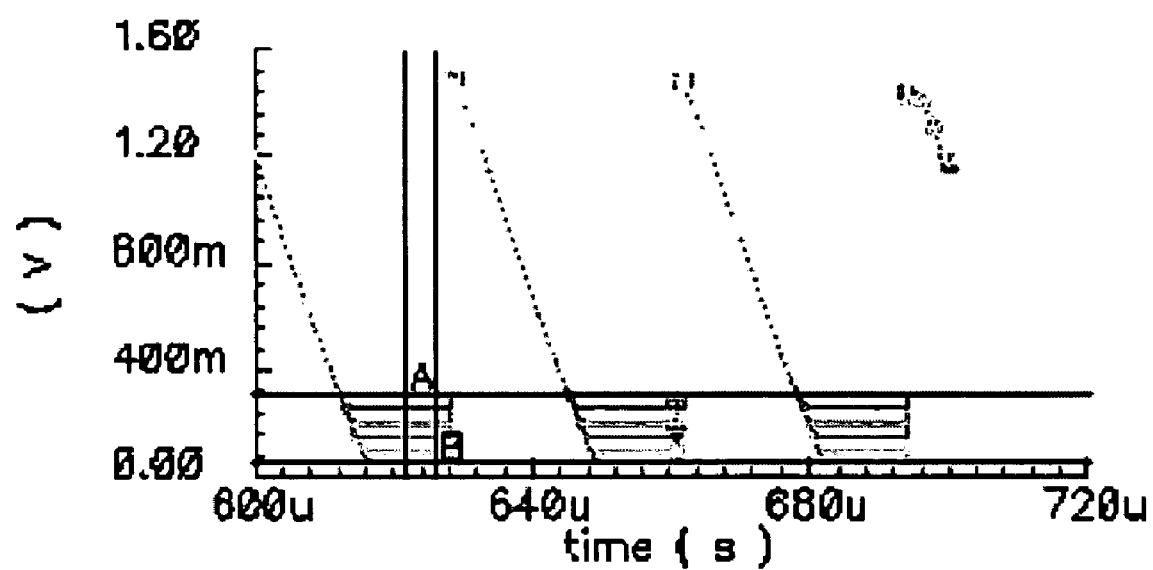
FIG. 14 is graph showing the time domain response at pixel output for various DAC settings in the circuit in FIG. 10.

FIG. 13 shows the clamp voltage at the active pixel output. The three groups of curves correspond to different temperatures. A transient simulation for the bus voltage in an active pixel is shown in FIG. 14. The clamping of the pixel bus voltage is determined by the DAC and the servo, which is referenced to the triode region edge voltage reference.

In the preceding detailed description of the figures, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical, chemical, and electrical changes may be made without departing from the spirit or scope of the invention. For example, while the above discussion focuses primarily on the use of n-channel CMOS transistors, p-channel CMOS transistors can he used with appropriate modifications in reference voltages and interpretation of output signals, MOS transistors may be used, as well as other suitable transistor types. In addition, although specific photosensor types have been discussed in particular embodiments above, various photosensors such as pinned photodiodes, photodiodes, photogates and the like may all be employed under proper circumstances in implementing the present disclosure. It has also been discussed, in the particular examples above, that the voltage applied to a reset transistor is varied (or scaled) with time such that excess charge generated by a photosensor is shunted to avoid blooming of the photosensor, and/or to provide an expanded dynamic range of an imager cell or a pixel cell.

Furthermore, many other varied embodiments that incorporate the teachings of the invention may be constructed by those skilled in the art. For example, the embodiments discussed above may have a pixel cell connected to a system employing an row and column select access configuration. Other suitable access configurations may be used to read out charge stored by a pixel cell without departing from the spirit and scope of the present disclosure. To avoid detail not necessary to enable those skilled in the art to practice the invention, the description may omit certain information known to those skilled in the art. Accordingly, the present disclosure is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present disclosure is defined by the appended claims.

We claim:

1. An image sensor array comprising:
   a plurality of imager cells, each including a reset transistor and a well; each imager cell being operable to selectively provide an output signal indicative of the amount of electrons stored in its well;
   a master pixel circuit having an output and having operational characteristics similar to those of one or more of the imager cells;
   a reference circuit having an output approximately representative of a maximum output of said imager cells;
   an amplifier having as a first input the output of said master pixel circuit, having as a second input the output of said reference circuit, and having an output coupled to an input of said master pixel circuit; and
   wherein the amplifier output is used to generate a voltage selectively applied to the reset transistors of at least some of said imager cells.

2. The image sensor of claim 1, wherein said voltage selectively applied to the reset transistors of at least some of said imager cells may be adjusted to accommodate different integration times of said imager cells.

3. The image sensor of claim 2, further comprising a digital to analog converter, wherein the output of said digital to analog converter is combined with the output of said amplifier to adjust said voltage selectively applied to the reset transistors of at least some of said imager cells.

4. The image sensor of claim 3, further comprising a memory for storing a plurality of adjusting values corresponding to different exposure times of said imager cells.

5. The image sensor of claim 1, wherein said master pixel circuit output is representative of said output voltage of any one or more of said imager cell when biased in the sub-threshold region at a fixed current.

6. The image sensor of claim 1, wherein said amplifier is a differential operational amplifier.

7. A method for preventing blooming in an image sensor array comprising the steps of:
   providing a plurality of imager cells, each including a reset transistor and a well; each imager cell being operable to selectively provide an output signal indicative of the amount of electrons stored in its well;
   providing a master pixel circuit having an output and having operational characteristics similar to those of one or more of the imager cells;
   providing a reference circuit having an output approximately representative of a maximum output of said imager cells;
   providing an amplifier having as a first input the output of said master pixel circuit, having as a second input the output of said reference circuit, and having an output coupled to an input of said master pixel circuit; and
   applying a voltage selectively to the reset transistors of at least some of said imager cells by using the amplifier output.

8. The method of claim 7, further comprising the step of:
   adjusting said voltage selectively applied to the reset transistors of at least some of said imager cells to accommodate different integration times of said imager cells.

9. The method of claim 8, further comprising the step of:
   providing a memory for storing a plurality of adjusting coefficients corresponding to different exposure times of said imager cells.

10. A method for preventing a spillover condition in a photosensitive imager containing a plurality of image cells comprising the steps of:
    producing, during an integration time, charge carriers at said imager cells in response to excitation radiation reaching respective imager cells;
    during said integration time, storing said charge carriers produced at said imager cell up to approximately a certain number and substantially removing from said imager cell any additional charge carriers produced in excess of that approximate number; and
    wherein the removal is accomplished by shunting said additional charge carriers through a reset transistor coupled to said imager cell, said reset transistor being selectively biased with a reset bias voltage determined in part by an output of a servo loop circuit that compares an output of a master pixel circuit having operating characteristics similar to said imager cells and a reference voltage approximately representative of the maximum linear output of said imager cells.

11. The method of claim 10, further comprising the steps of:
providing an adjustment voltage; and
combining the adjustment voltage with said output of the servo loop circuit to determine said reset bias voltage.

12. A photosensitive apparatus, comprising:
a photodetector and a reset transistor located in an imager cell;
a spillover protection device, controlled by an anti-blooming circuit, for applying a bias to said reset transistor in response to a spillover condition.

13. The apparatus of claim 12, wherein said anti-blooming circuit comprises a master pixel circuit, having characteristics substantially identical to operating characteristics of said imager cell, and a reference circuit, having as an output a potential indicative of said spillover condition.

14. The apparatus of claim 13, wherein said reset transistor has a gate, a source, and a drain; wherein applying a bias to said reset transistor comprises coupling an output of said spillover protection device to the gate; and wherein said bias is determined by said anti-blooming circuit by comparing an output of the master pixel circuit to an output of a reference circuit that approximates a maximum voltage at which operation said imager cell operates linearly.

15. The apparatus of claim 12, wherein said anti-blooming circuit has an output which is self-calibrating.

* * * * *